May 10, 1932.  A. R. IRUZ  1,858,094
PNEUMATIC TIRE
Filed Dec. 19, 1930  2 Sheets-Sheet 2
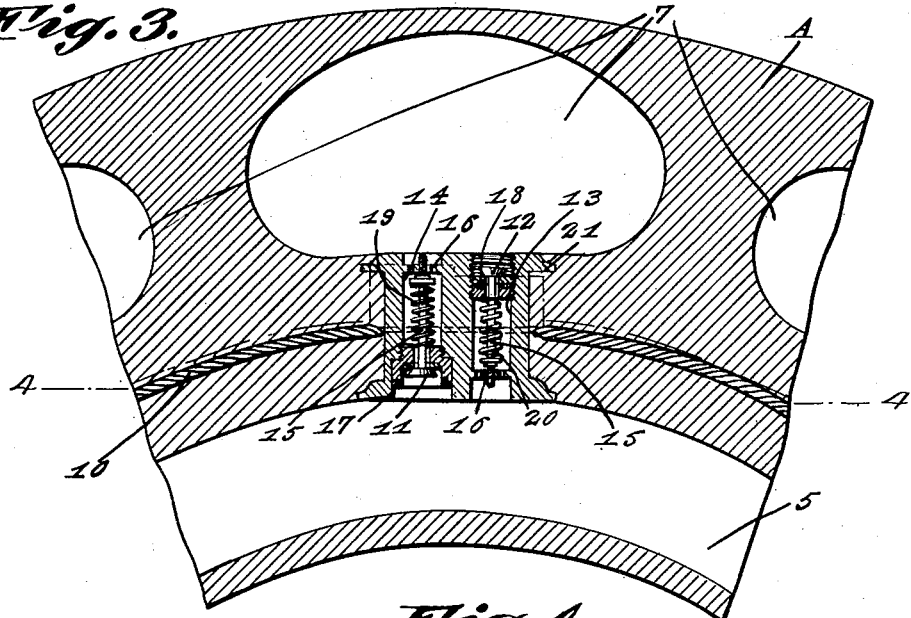
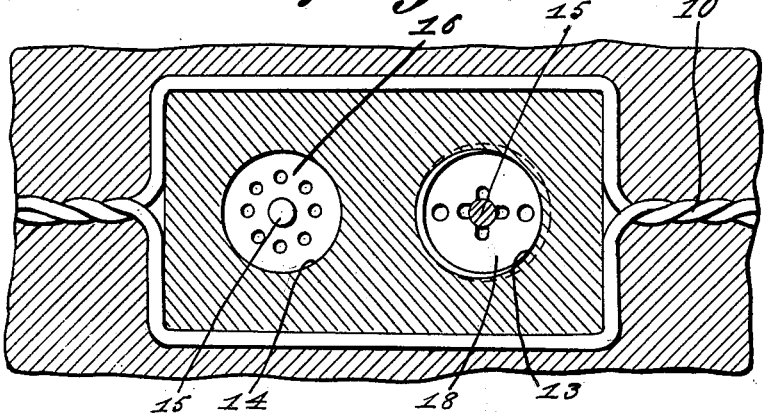
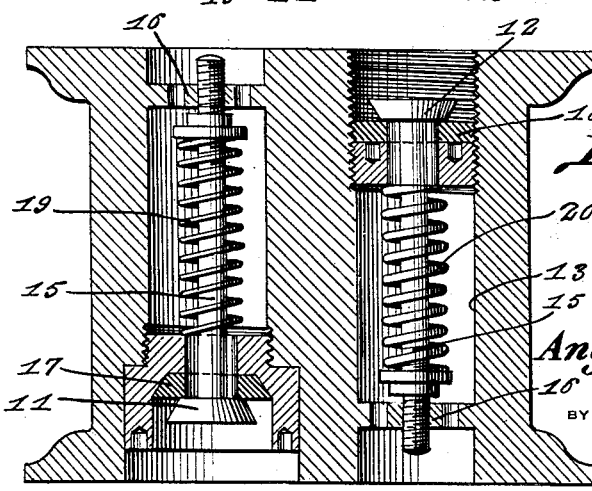
Angel Rivas Iruz,
INVENTOR
BY Victor J. Evans
and A. L. Evans ATTORNEYS Patented May 10, 1932

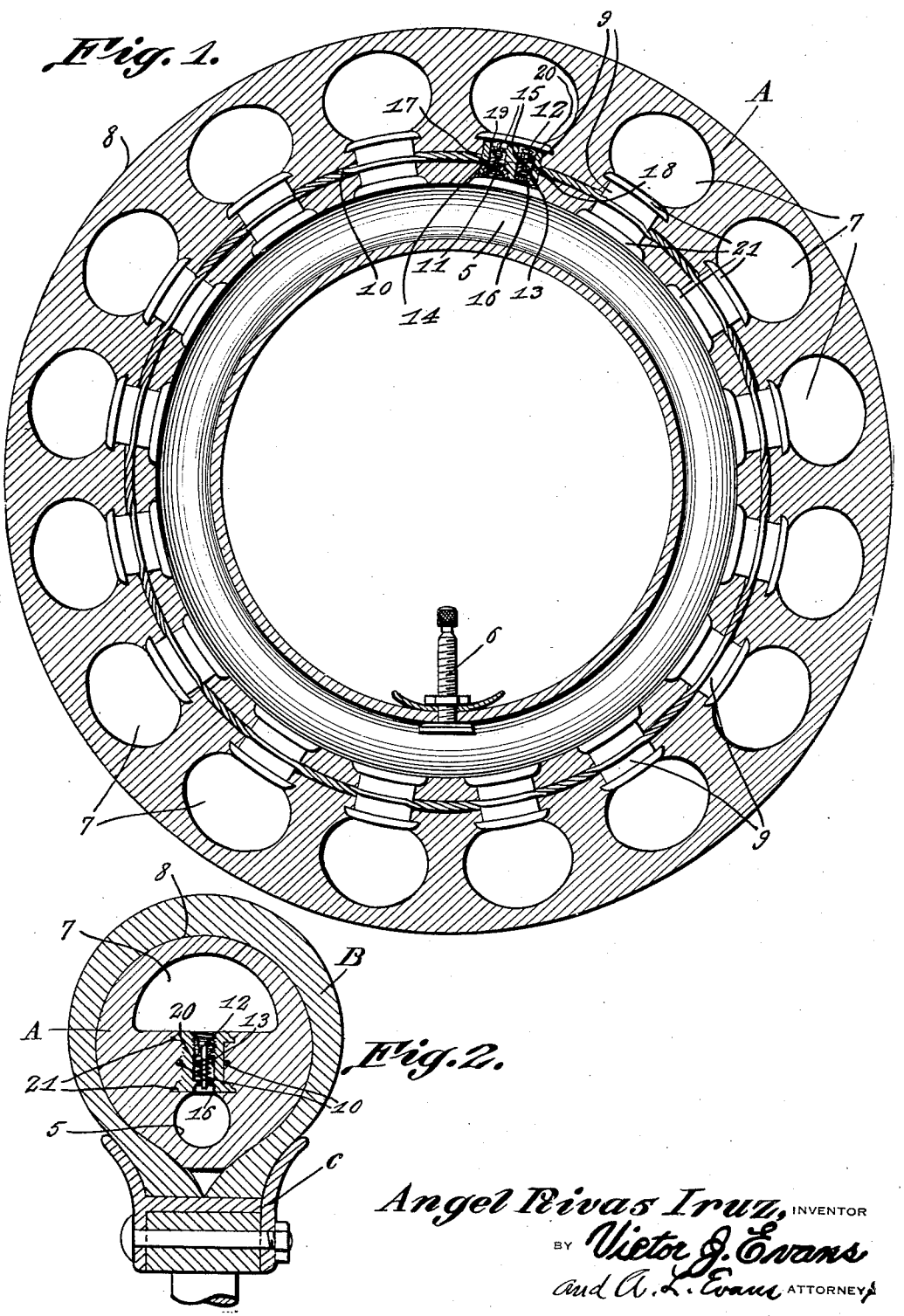

1,858,094

UNITED STATES PATENT OFFICE

ANGEL RIVAS IRUZ, OF TORREON, MEXICO

PNEUMATIC TIRE

Application filed December 19, 1930. Serial No. 503,570.

The invention relates to a tire construction, and more especially to pneumatic tires, preferably including a shoe or outer casing and an inner annulus tube, the latter being formed with a main conduit for air and concentrically thereto a series of cells for air, these being in communication with the conduit for the purposes of maintaining the tire inflated when filled with air.

The primary object of the invention is the provision of a tire construction of this character, wherein the same will serve to prevent complete deflation should a puncture occur throughout any portion of the tread area of said tire, the tire in its make-up being novel in form and will sustain loads and having the required resiliency for service.

Another object of the invention is the provision of a tire of this character wherein it possesses the high degree of resiliency as in an ordinary pneumatic tire and which at the same time is so constructed that in event of a puncture, the area thereof so affected will not cause the deflation of the tire and thus in this manner keeping the tire in serviceable condition until its punctured area can be conveniently repaired.

A further object of the invention is the provision of a tire of this character which is simple in construction, thoroughly efficacious in its purpose, strong, durable and inexpensive to manufacture.

With these and other objects in view, the invention consists in the features of construction, combination and arrangement of parts, as will be hereinafter more fully described in detail, illustrated in the accompanying drawings which disclose the preferred embodiment of the invention, and pointed out in the claim hereunto appended.

In the accompanying drawings:—

Figure 1 is a vertical sectional elevation of a tire constructed in accordance with the invention, with the shoe or outer casing removed.

Figure 2 is a vertical transverse sectional view therethrough of the tire.

Figure 3 is an enlarged fragmentary vertical sectional elevation showing in detail the valve mechanism between the conduit and one of the air cells.

Figure 4 is a sectional view on the line 4—4 of Figure 3, looking in the direction of the arrows.

Figure 5 is an enlarged sectional view through the valve assembly shown in Figure 3.

Similar reference characters indicate corresponding parts throughout the several views in the drawings.

Referring to the drawings in detail, the tire structure comprises an inner annular body A made from resilient material, such as rubber or a composition thereof, the cross sectional area of which conforms substantially to the cross sectional area of a shoe or outer casing B, either of the clincher or rim engaging type for the demounting of the tire from the rim C of a wheel, the shoe or outer casing being of any standard construction.

The body A, within the inner peripheral portion of the same, is formed with a circular continuous conduit 5 to which leads the valve stem 6, the latter being mounted in the body in the usual well known manner and through which is introduced air under pressure to said conduit.

Within the body A concentrically with respect to the air conduit 5 is formed a plurality of equi-distantly spaced air chambers or cells 7, these being of any desirable capacity or size and of any shape required to afford maximum resiliency throughout the tread area 8, while embedded in the body A between the cells 7 and the conduit 5 and disposed radially in said body are valve casings 9 having valve mechanism in each of the same, as will be hereinafter fully described.

Embedded in the body A concentrically with respect to the conduit 5 and encircling pairs of the valve casings 9 is a reinforcing element 10, in this instance, of a pair of twisted wires which connect the entire series of valve casings 9 for the anchoring thereof and also for the reinforcement of the body A, as will be clearly apparent.

The valve mechanism in each casing 9 comprises a pair of reversely set or operating valves 11 and 12, these being arranged in spaced air passages 13 and 14 respectively, and said valves have their stems 15 working in guides 16, while their heads are adapted to engage valve seats 17 and 18 respectively. The stem 15 of the valve 11 has about it a coiled tensioning spring 19 of a light tension to maintain the valve 11 engaged with the seat 17, the tension thereof being corresponding to approximately atmospheric pressure.

The stem 15 of the valve 12 has engaged about the same a coiled tensioned spring 20, which is of a tension predetermined to withstand a determined pounds pressure of air to hold the valve engaged with its seat 18, the seats 17 and 18 for the valves being preferably removably threaded in the casing 9, while the latter at opposite ends confronting the conduit 5 and cells 7 are flush therewith and are provided with marginal rims 21 for the anchoring or seating of said casing in the body A of the tire.

On inflating the tire, air under pressure is delivered to the conduit 5 through the stem 6 and the valves 12, and in this manner the chambers or cells 7 will be inflated simultaneously and likewise the conduit 5, all with a uniform pressure.

The casing 9, as has been heretofore pointed out, includes therein a double valve with their heads in opposite directions so that valve 11 will confront the conduit 5 and the valve 12 confronting the cells 7 and the spring 20 of the valve 12 will be calculated to support from the lowest to the highest pressure and will serve to allow the air to pass from the conduit 5 to the respective cells after exceeding the pressure in said conduit 5. In event of the puncture of any one of the cells 7, this spring 20, calculated to a determined resistance, will prevent the escape of air from the remaining cells 7 and the conduit 5.

It will be apparent that when the tire is inflated, all of the chambers or cells 7, through the medium of the valve mechanism in the casing 9, are in free communication with the conduit 5, which latter forms a connecting conduit, thus rendering the tire practically as resilient as the ordinary pneumatic inner tube structure or tire. It will be apparent that the tire can be deflated like an ordinary pneumatic tire because when the pressure is reduced in the conduit 5, the valves 11 will open to bleed the chambers or cells 7 for the deflation or discharge of air therefrom.

What is claimed is:—

A tire construction of the character described, comprising a resilient annular body having a continuous circular conduit and a plurality of spaced cells circumferentially and concentrically of the conduit, reversely acting and varying tensioned valves controlling communication between each cell and the conduit, a casing containing the valves between each cell and the conduit and embedded in the body, and a continuous reinforcement embedded in the body between the conduit and cells, and embracing the casings.

In testimony whereof I affix my signature.

ANGEL RIVAS IRUZ.